April 21, 1936. S. A. REDDING 2,038,001

TRAILER

Filed July 29, 1932  4 Sheets—Sheet 1

INVENTOR,
SAMUEL A. REDDING.
BY
ATTORNEY

April 21, 1936.  S. A. REDDING  2,038,001

TRAILER

Filed July 29, 1932    4 Sheets-Sheet 2

INVENTOR.
SAMUEL A. REDDING.
BY
ATTORNEY

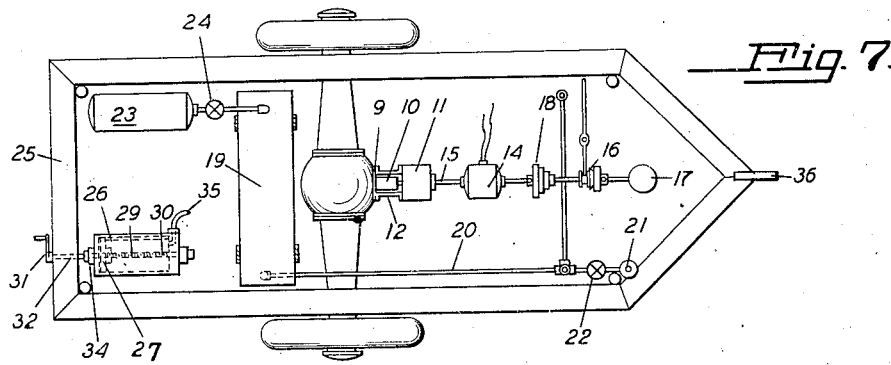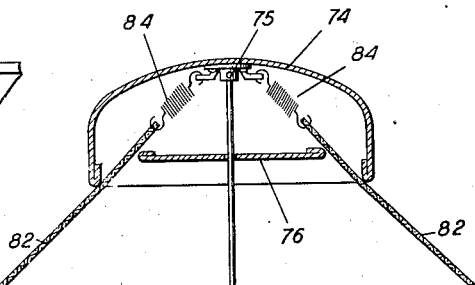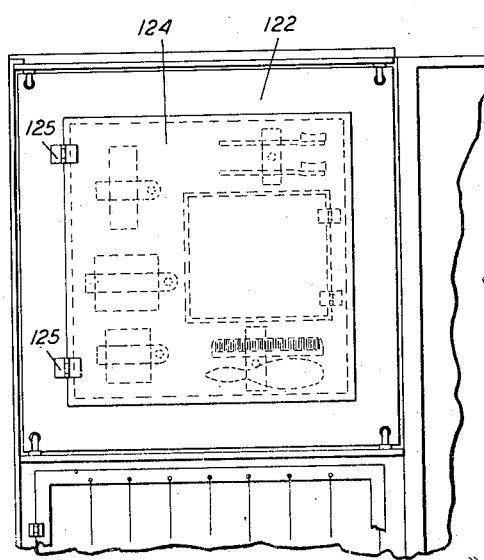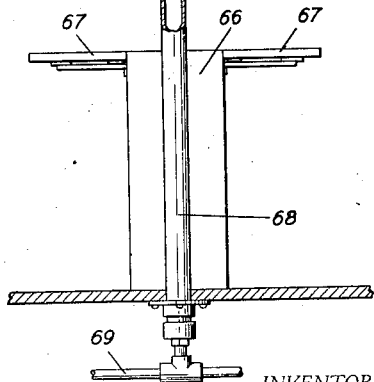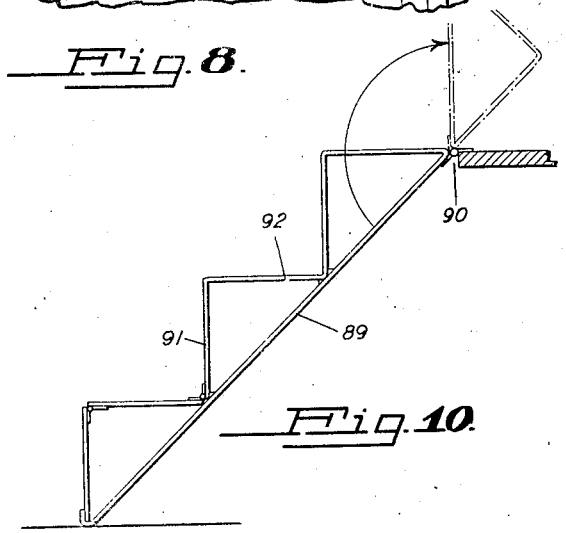

April 21, 1936.  S. A. REDDING  2,038,001
TRAILER
Filed July 29, 1932  4 Sheets-Sheet 4
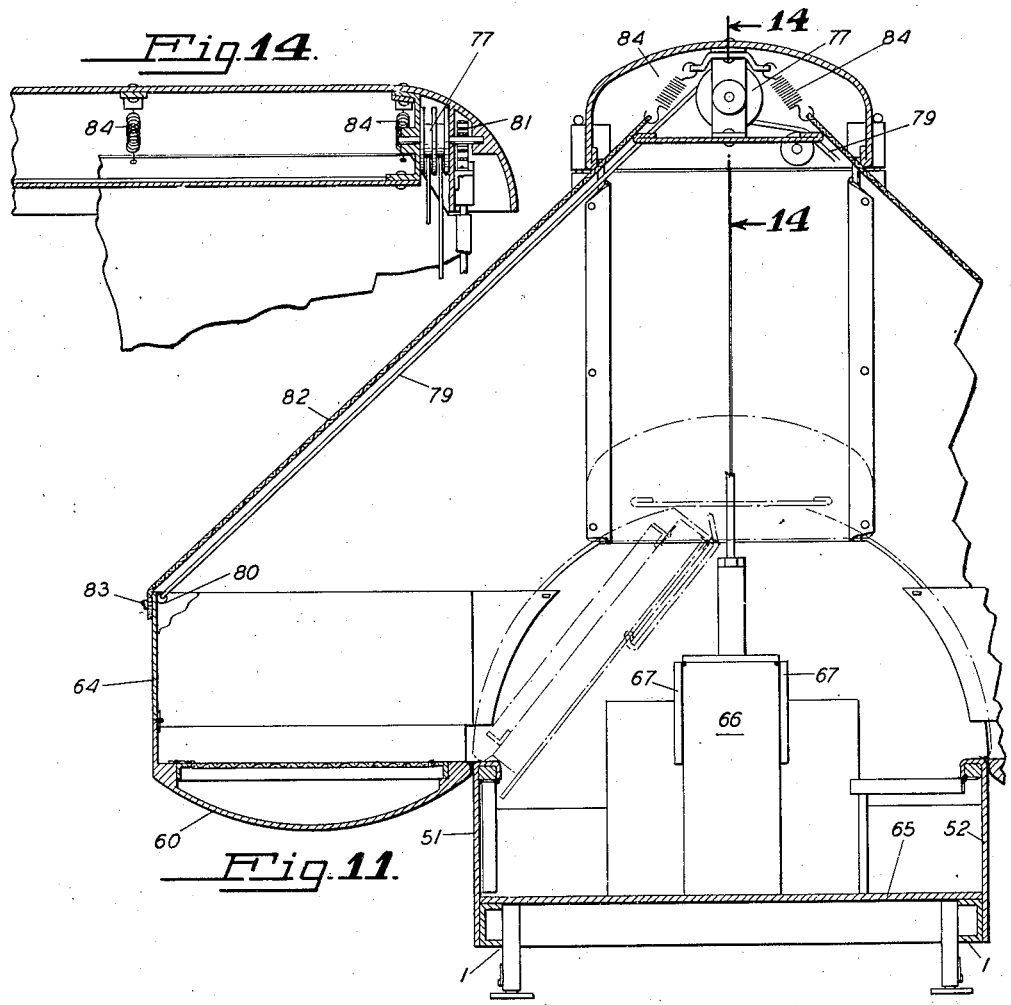
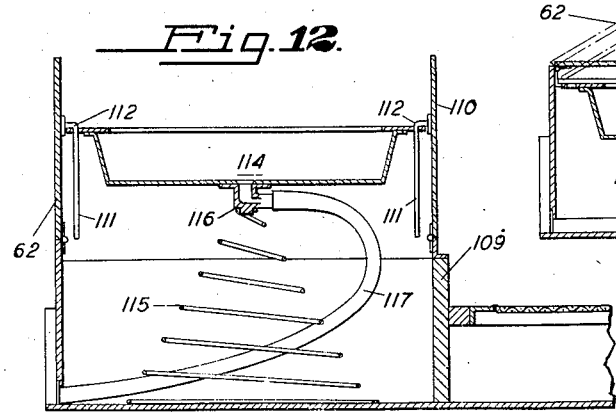
INVENTOR.
SAMUEL A. REDDING.
BY Donald K. Lippincott
ATTORNEY Patented Apr. 21, 1936

2,038,001

UNITED STATES PATENT OFFICE 2,038,001

TRAILER

Samuel A. Redding, Oakland, Calif.

Application July 29, 1932, Serial No. 625,888

1 Claim. (Cl. 296—23)

My invention relates to trailers and more specifically to a trailer for an automotive vehicle, the trailer being condensed into a small compact body for ease of transport, yet affording sufficient head-room and space for comfortable living or other use when unfolded.

The objects of my invention are: To provide a trailer having a large amount of useful space which may be compactly folded for ease of transport; to provide a collapsible trailer body which may be quickly erected by one person; to provide means for erecting and expanding a trailer body; to provide a trailer body which is small and compact when folded; to provide a folding trailer body which has a low center of gravity; to provide a trailer with a self-maintained source of electric power; to provide accessories for a folding trailer body which themselves fold into a minimum space; to provide a folding trailer which which offers a maximum of built-in accessories which cooperate in the forming of the unfolded body; and to provide a trailer having a maximum of comfort and free space which can be reduced by the coordination of parts to a minimum of size during transport.

Other objects of my invention will be apparent or will be specifically pointed out in the description forming a part of this specification, but I do not limit myself to the embodiment of my invention herein described, as various forms may be adopted within the scope of the claim.

Referring to the drawings:

Figure 7 is a view from above of the trailer chassis showing the power plant.

Figure 8 is a view looking down on the end of an out-folded side wall showing a wash stand.

Figure 9 is a view partly in section and partly in elevation showing the roof support and hydraulic hoist cylinder.

Figure 10 is a view in section of the rear door as outwardly revolved to form the entrance steps.

Figure 11 is a sectional view showing the method of folding or erecting the roof, and the side walls with their supports.

Figure 12 is a sectional view of a sink in position as used.

Figure 13 is a sectional view of the sink as collapsed during transport.

Figure 14 is a detailed sectional view taken in the plane indicated by the line 14—14 in Figure 11.

Figure 1:
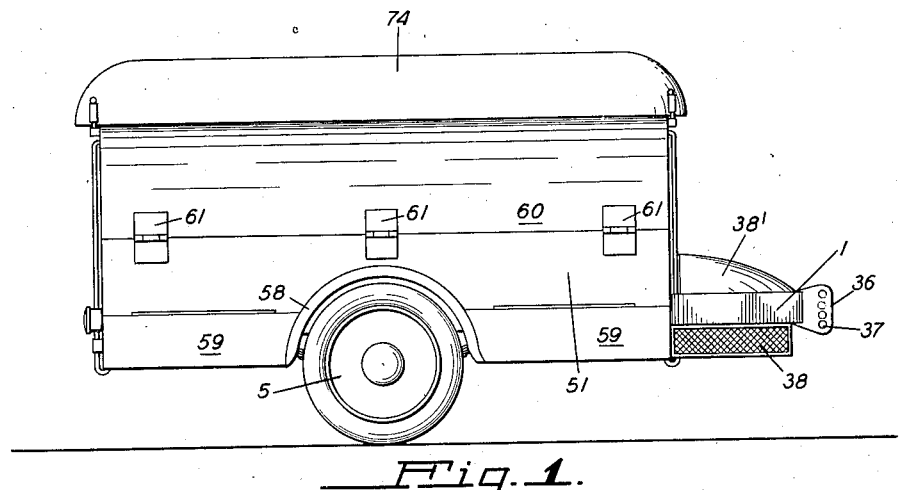
Figure 1 shows a view in elevation from one side of the closed or folded trailer.
Figure 2:
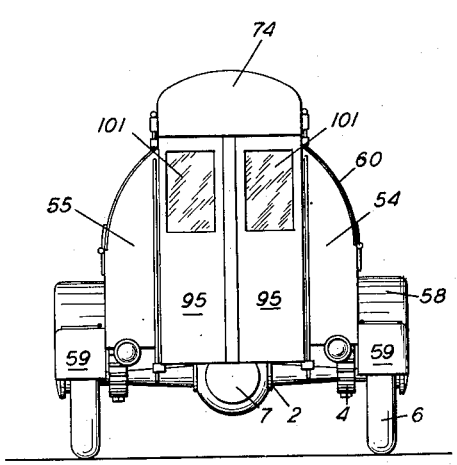
Figure 2 is a rear view in elevation of the closed trailer.
Figure 3:
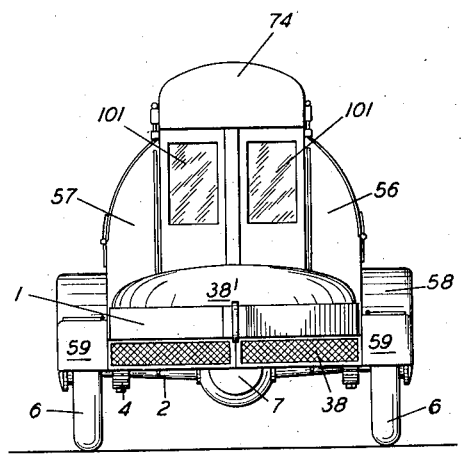
Figure 3 is a front view, also in elevation, when closed.

Trailers for automobiles are limited in width by numerous statutes, and in length by practical considerations of transport. A trailer to be comfortable and acceptable for tourist use must also be spacious and have sufficient head-room. While these requirements appear to be contradictory, I have found that by folding and compacting the various essential body parts that I am able to produce a trailer that will combine all the elements of camping comfort with good roadability and clearance during times of transport, and include in the trailer such accessories as make the erection and use of the trailer an easy matter without the use of more than ordinary understanding and skill.

Broadly speaking my invention comprises a trailer body which may be compactly folded while on the road, and expanded while camping. The body comprises a foundation portion, an erectable roof, and hinged side walls partially folded under the roof when the roof is retracted, and extended at right angles away from the foundation portion to form bunks when the roof is raised. Simple power application permits the raising of the roof by one person. When raised, a fabric roof extension protects the interior of the trailer. Various fixtures are built into the interior of the trailer body, which fold or collapse into small space. The body is spring mounted on a live axle, from which, through gears power is applied to a generator for charging batteries while under way. The current thus stored may be used for lighting or to compress air and for various useful purposes.

The drawings delineate a preferred form of my invention. A frame 1 of angle iron of heavy section is mounted on an axle 2 by means of heavy springs 4. The axle is of the type used in the driving assembly of cars and trucks, in which a live axle is connected to the wheels. In this case the wheels 5 equipped with tires 6 drive a live axle (not shown) through the differential 7 to a power shaft 9 as shown in detail in Figure 7. This power shaft is provided with an overrunning clutch 10 and then leads to the shaft of an electric generator 11 which is attached solidly to the rear axle by the clutch frame 12. The end of the generator shaft is connected to a motor 14 by flexible link 15. The power shaft may also be extended beyond the motor through a manually operated clutch 16 to an air compressor unit 17. Pulleys 18 of various sizes may be clamped to the shaft for power take-off purposes.

When the trailer is being towed the clutch 10 transmits power to the generator and the current thus supplied may be used to charge a storage battery carried in the trailer, the motor running free. When the trailer is standing, the motor 14 may be energized from the battery and when connected to run in the same direction as the generator, will turn freely due to the release of the clutch 10. The manual clutch 16 will allow the air compressor to be run directly from the axle, or from the motor, or to be entirely disconnected.

Also mounted on the frame is a water supply system comprising a water tank 19 leading through a supply line 20 to washstand and sink within the body to be later described. The tank is filled through the supply pipe by use of the funnel 21, guarded by a watercock 22. Pressure is maintained in the tank by a connection to an air reservoir 23 through an air-cock 24. The air reservoir is replenished from the air compressor 17. Air may be withdrawn from the reservoir for filling tires or any other desired purposes.

Mounted on the rear cross member 25 of the frame is a hydraulic hoist pump 26 having inside a close fitting piston 27 and a shaft 29 carrying a coarse thread 30. The center of this piston is cut out to fit the thread, and a crank 31 is mounted on a pump shaft extension 32 through a stuffing box 34. The piston is prevented from rotating by an extension into a slot in the inner cylinder wall, so that when the crank is turned, the piston will progress along the cylinder. Oil, placed in the cylinder, will be forced out into the pipe 35 under pressure to operate the roof hoist, later described.

The forward ends of the frame side members are bent to meet each other in the center line, and are welded to a draw-bar plate 36 which is drilled with several holes 37 to enable the user to vary the towing angle. I provide a radiator 38 underneath the frame which may be used in conjunction with an electric refrigerator or like purposes, and a dust-cover 38' above the frame to protect the radiator.

Figures 5, 6:
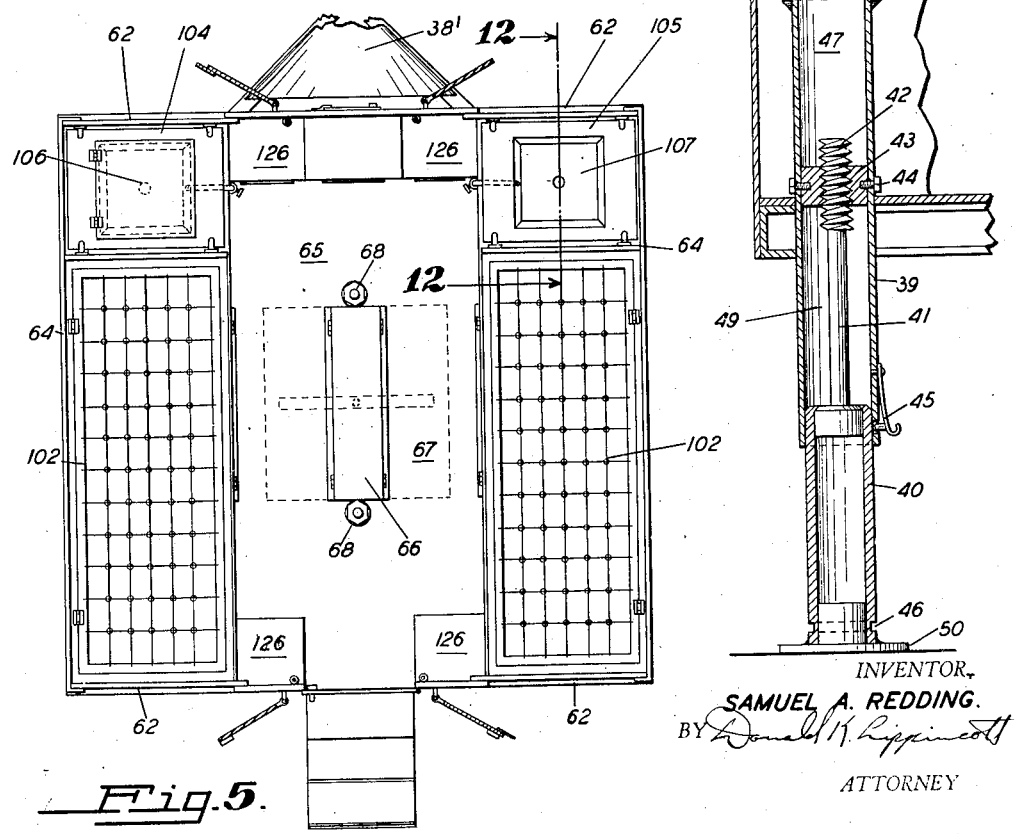
Figure 5 is a view from above showing the floor plan of the opened device.
Figure 6 is a detailed section of a jack.

In each corner of the frame is attached a jack as shown in Figure 6, comprising a housing 39 extending into the interior of the trailer, and having a slidable foot 40 fitting closely inside. The foot is welded to a jack-screw 41 working with a rather short thread 42 in a die block 43 fastened to the housing by bolts 44. Snap-catch 45 holds the foot up by dropping into a depression 46 when the trailer is towed. To release the jack, the foot is rotated, the screw progresses upward until it frees itself from the die-block. Then the foot and screw may be pushed upward until the screw reaches the top of the space 47. At that point the snap-catch falls into the depression and the jack-foot rides well away from the ground in the space 49. Release of the snap-catch causes the jack-screw to fall so that the threads may be engaged and the remaining distance is taken up by hand rotation. It is convenient to have a foot-plate 50 rotatable in the bottom of the foot to reduce friction when the jack touches the ground.

Mounted longitudinally along the frame are side sills 51 and 52. These together with rear endplates 54 and 55, and front sections 56 and 57, form the general foundation of the trailer body. Fenders 58 are welded to the side sills, and food boxes 59 are secured to the sills for purposes of storage.

Folding side walls 60 of convex exterior curvature are fastened to each side sill by hinges 61. These side walls extend the full length of the body and are curved convexly toward the outside. When folded inwardly as shown in Figures 1, 2, 3 and 11, their inner edges almost meet in the center, and they rest at an angle of substantially 90° to one another. The rear endplates 54 and 55, and the front sections 56 and 57 are contoured to fit the curve of the folded side walls and the ends of the side walls fit tightly against the end sections to keep out moisture and dust.

The side walls when opened outwardly to an angle of 90° to the side sills are provided with end boards 62 and side boards 64 which are hinged to the side walls and which may be opened and locked together to form a solid railing around the opened side wall.

Passing to the interior of the trailer, I have provided a floor 65 having in its center a folding table 66 wtih hinged leaves 67. On each end of this table, firmly bolted to the floor, is a hoist cylinder 68 connected to the hydraulic pump by means of the pipe 69. This is capped with a guide 70 through which projects a roof connecting rod 71 having a piston 72 working in the cylinder on one end and having its opposite end firmly held to a narrow curved roof 74 by a fitting 75, and partially braced by a shelf 76, which also serves to hide machinery above, later described.

The roof is thus supported by the two connecting rods and may be erected by supplying oil from the hydraulic pump to the cylinders, and retracted by withdrawing the oil.

When the side walls are folded together and the roof is retracted, the roof closes down tightly over a portion of the side walls and makes a dust and water-tight fit.

Directly under the roof is mounted a drum 77 on which are rolled support cables 79, which are attached to eye-bolts 80 on the upper border of the side boards. A spring, not shown, maintains tension on the cables and carries the weight of the side walls and contents. Normally, four cables are used, one at each end of each side board, and the drum is provided with a stop-catch 81 to prevent the side walls passing the 90° angle.

A canvas roof extension 82 is stretched between the upper border of each side wall and the center of the roof interior, held onto the side boards by snaps 83, and tensioned by a number of springs 84 under the roof. These prevent the canvas from sagging. When the side walls are folded, the cable slack is taken up by the drum, and the canvas is folded or draped under the roof.

Figure 4:
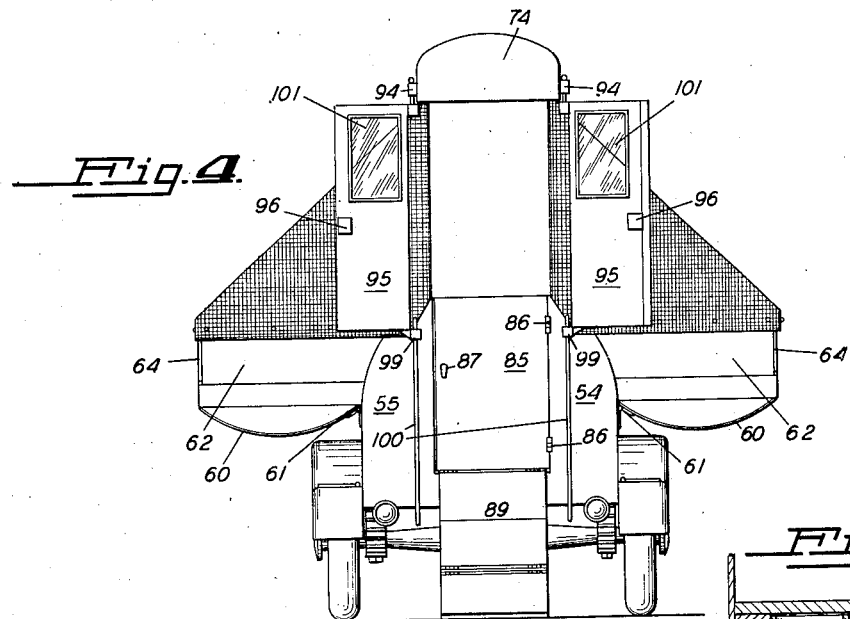
Figure 4 is a view from the rear of the trailer as unfolded or opened.

Figures 4 and 10 show the rear door and step arrangement. A short rear door 85 is attached to a rear end-plate 54 in the usual manner by hinges 86 and provided with a door catch 87. Just inside the bottom of the door, where it joins the floor, a stair-plate 89 is fastened by hinges 90 to swing downwardly. Risers 91 and steps 92 are applied to this plate so that when the plate is swung outwardly and down to the ground, stairs are formed for entrance to the trailer. When the trailer is collapsed, the door is opened, the stairs folded inside the door, and the door closed again to secure the stairs, inside the trailer.

At both ends of the trailer body, fastened to the roof by upper ordinary hinges 94, are split doors 95, meeting in the center of the door space and provided with locks 96. The lower hinges comprise knuckles 99, sliding on a long pintle rail 100. The split doors are mounted, on the rear of the trailer, outside of the rear door so that when the roof is lowered, the knuckles slide along the pintle rail, operate as hinges in all roof positions and close over the rear door when the roof is completely down. Locking the split doors then locks the rear entrance completely.

In front, as there is no inner door, the split doors simply slide down over the front panel. When the roof is erected the front split doors may be opened for ventilation. The split doors all carry glass panels 101, and consequently also serve as windows. If desired the glass panels may be separable and, in conjunction with a screen, serve to provide ventilation when the doors are closed.

Returning again to the interior, metal mesh supports 102 are stretched across a portion of the interior of the curved side walls over which fabric and padding may be placed to form a mattress structure. I prefer to make the length of the side walls sufficient to provide at least a six foot bunk length, and still have room for a sink and drainboard assembly 104 on one side, and a washstand assembly 105 on the other.

As the sink 106 and the washstand 107 operate in the same manner, I have illustrated only one of them, as shown in Figures 12 and 13.

A base 109 is built into the space between the end of the bunk and the front end-board 62.

The front end-board 62 forms when folded down one of the covers of the assembly, and split-cover 110 forms the other cover when folded, and a bunk head-board when erected. Both of these covers are provided with guides 111 fitting into holes 112 in a bowl 114. A large spring 115 maintains a constant pressure against the drain fitting 116, so that when the covers are opened, the bowl will rise to a plane near the top of the assembly.

A flexible drain pipe 117 is provided for disposal of waste, and connects with the outside of the trailer where a waste tank may be installed, or another pipe reaching into a hole dug in the ground.

To close up the sink assemblies the bowl is pushed down, the covers folded over, and the side boards placed over them again.

It may also be desirable to provide additional covers for these sink assemblies as shown in Figure 8.

Here the bowls are fitted to a partition 122 which slides up and down as I have described for the bowls, and a cover-plate 124 is fastened over the bowl by straps 125. This cover-plate may be made double walled and the interior used as a medicine chest or container for toilet articles or the like.

Space in the interior corners of the main trailer body I prefer to use as storage cabinets 126, which also serve as a concealment for the jack housings which project through the floor.

In front I connect the two corner cabinets to form a space ideally located for a refrigerator, which if for ice may be loaded through the front panel, or an electric compressor unit may be operated from the storage battery in conjunction with the radiator 38. The tops of these cabinets are preferably table high and may be used as shelves when camping.

When a stop is made while traveling, and the trailer is completely collapsed, one person may readily prepare the device for immediate use.

The jacks are released and the trailer leveled. A few turns on the hydraulic pump, which may be operated by the towing car crank if desired, and the roof rises into place. The side walls are swung out at right angles to the body, side and end boards raised and the cables pick up the weight. Fabric roof extensions are snapped in place, various folding accessories are opened, and the trailer is ready for occupancy. The reverse of folding process is also simple and will present no difficulties for the average person.

It is contemplated that the structure as described may be used for various purposes other than camping, or tourist caravanning. With slight interior changes, the body may easily be adapted for a traveling store or library or like purposes easily recognized by one skilled in the art.

I claim:

In a trailer, a frame, side walls hinged on said frame and movable to incline toward each other when said trailer is collapsed and to extend outwardly in substantially a common plane when extended, a plurality of vertically extensible telescopic support members mounted on said frame, flexible roof members having inclined portions joining the side walls and the top of the support members, a roof cap movable with said support members and adapted to enage the proximal edges of said side walls when said support members are lowered and to contact said roof members at points on the inclined portions thereof when said support members are extended, support cables fastened to said side walls and a winch, having a single drum mounted in said roof cap for rolling up said cables simultaneously on both sides of said support members.

SAMUEL A. REDDING.